March 10, 1959 L. C. STENNING 2,877,305

MULTICHANNEL COMMUNICATION SYSTEM

Filed Oct. 28, 1953 3 Sheets-Sheet 1

March 10, 1959 L. C. STENNING 2,877,305

MULTICHANNEL COMMUNICATION SYSTEM

Filed Oct. 28, 1953 3 Sheets-Sheet 3

United States Patent Office 2,877,305

Patented Mar. 10, 1959

2,877,305

MULTICHANNEL COMMUNICATION SYSTEM

Luis C. Stenning, Wembley, England, assignor to Hazeltine Research, Inc., Chicago, Ill., a corporation of Illinois Application October 28, 1953, Serial No. 388,775

Claims priority, application Great Britain November 11, 1952

14 Claims. (Cl. 179—15)

Figure 1:
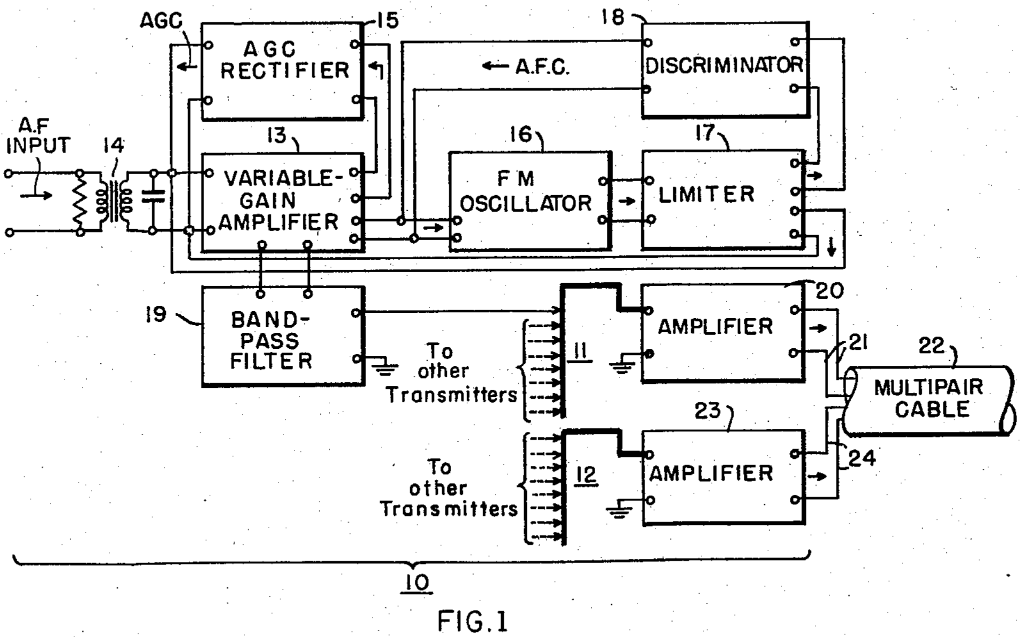

The present invention relates to multichannel electrical communication systems and, more particularly, to such systems which employ a plurality of pairs of conductors in an electrical cable interconnecting the terminal stations thereof.

For some applications it is desirable to increase the traffic-handling capacity of communication systems of the type mentioned above. The cables in such systems comprise a large number of pairs of conductors, each of which at present is associated with a single speech circuit. Because of the large value of cross modulation or cross talk between the pairs of conductors which would occur when using ordinary carrier-current equipment therewith, it has not been considered practical to use such equipment in conjunction with multipair cables. Far-end cross talk may be as large as 35 decibels at 150 kilocycles/second so that an improvement in the signal-to-cross-talk ratio is necessary.

It is an object of the invention, therefore, to provide a new and improved multichannel communication system which employs a multipair cable and has a low value of cross talk between the conductor pairs of the cable.

It is another object of the invention to provide a new and improved multichannel communication system which affords an improved signal-to-cross-talk ratio and is relatively simple in construction and inexpensive to manufacture.

It is a further object of the invention to provide a new and improved multichannel communication system which does not require the use of a large number of electron tubes and other circuit elements.

In accordance with a particular form of the invention, a multichannel communication system comprises a first terminal station including a plurality of volume compressors individually responsive to individual ones of a plurality of modulating signals for developing therefrom volume-compressed signals, a plurality of devices individually responsive to individual ones of the aforesaid volume-compressed signals for producing wave signals frequency-modulated thereby, and a plurality of means individually responsive to individual ones of the aforesaid wave signals for developing therefrom amplitude-modulated wave signals having amplitudes varying inversely with the amplitudes of the aforesaid modulating signals. The multichannel communication system also includes a plurality of signal-translating paths which are coupled to the first terminal station for translating the aforesaid developed wave signals but are subject to electrical couplings producing undesired cross talk in the system. The communication system further includes a second terminal station including a plurality of volume compressors individually responsive to individual ones of the translated wave signals for developing therefrom volume-compressed wave signals of substantially constant amplitude, a plurality of frequency detectors individually responsive to individual ones of the volume-compressed wave signals for deriving therefrom individual signals corresponding to the first-mentioned volume-compressed signals, and a plurality of volume-expander means individually responsive to individual ones of the derived signals for producing signals which are faithfully representative of the modulating signals and are relatively free from effects of undesired cross talk.

For a better understanding of the present invention, together with other and further objects thereof, reference is had to the following description taken in connection with the accompanying drawings, and its scope will be pointed out in the appended claims.

Figure 1A:
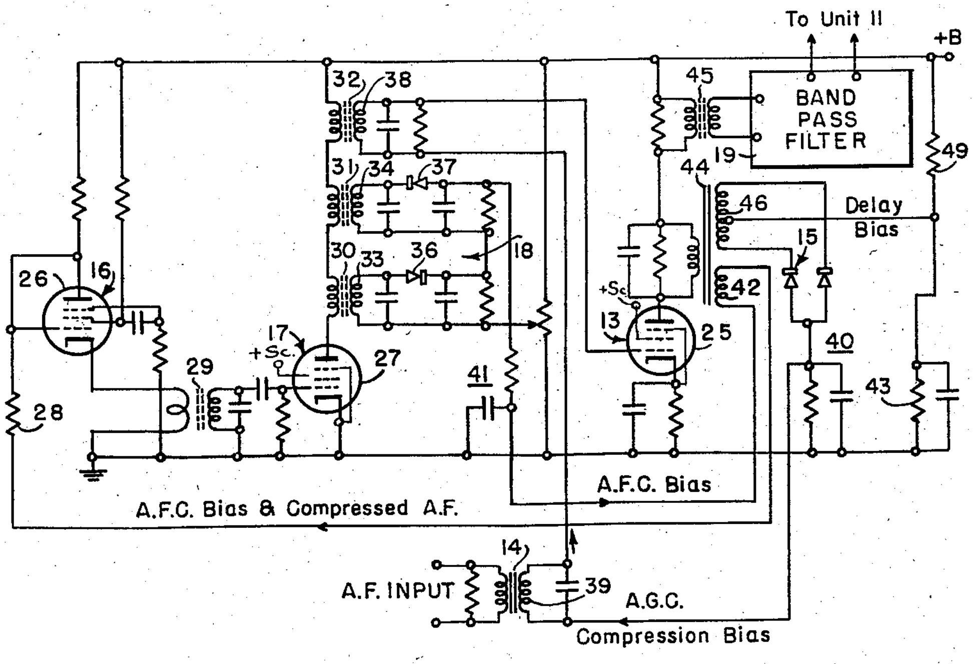
Figure 2:
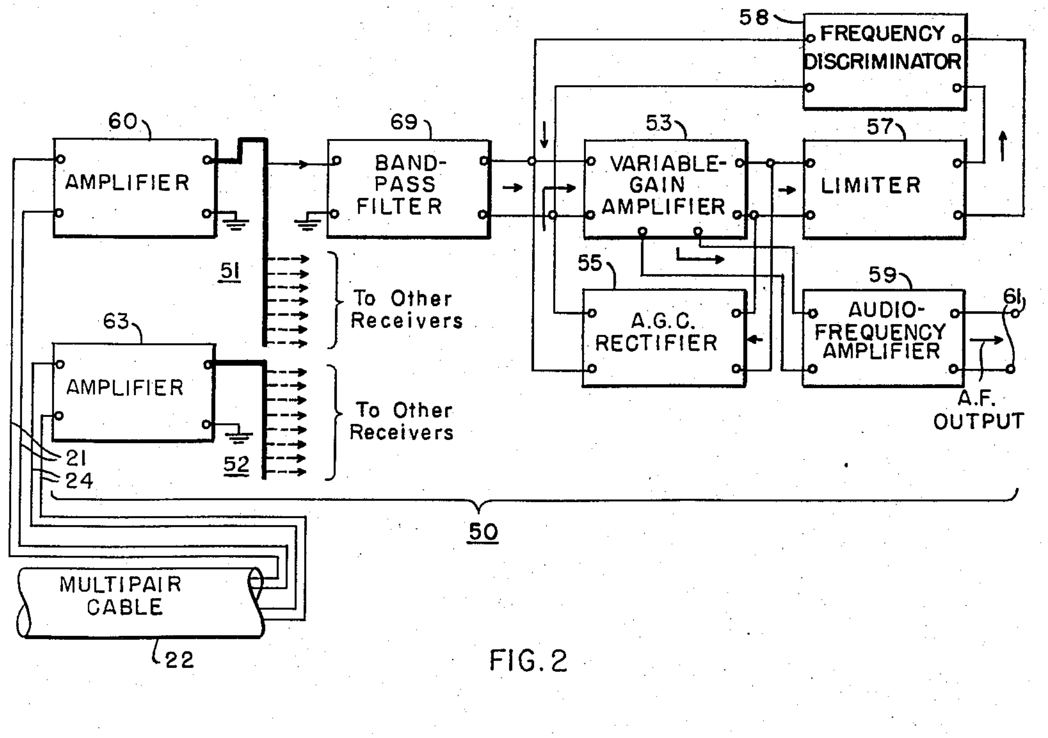
Figure 2A:
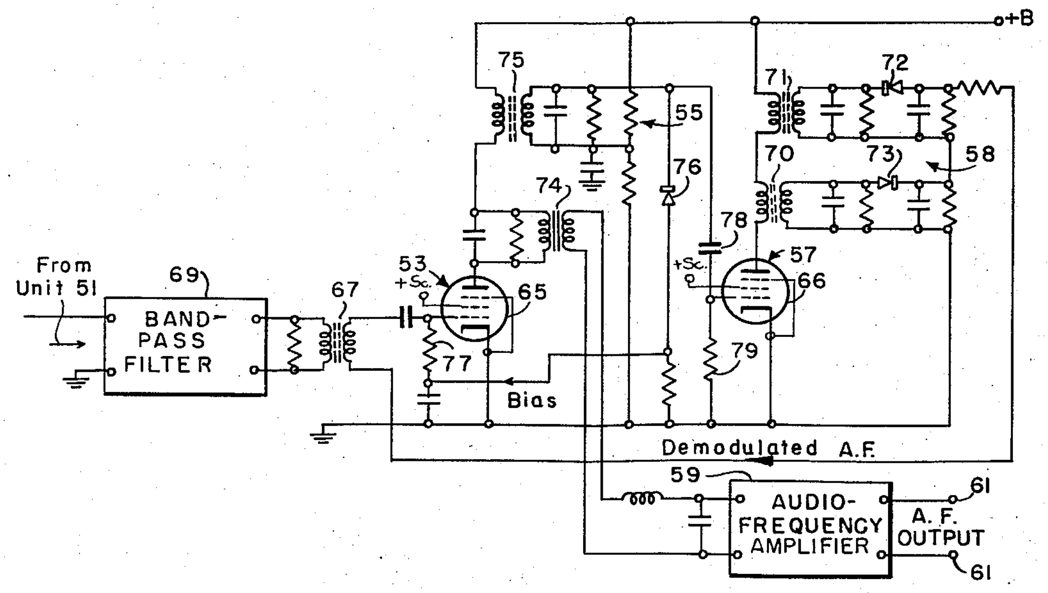
Figure 3:
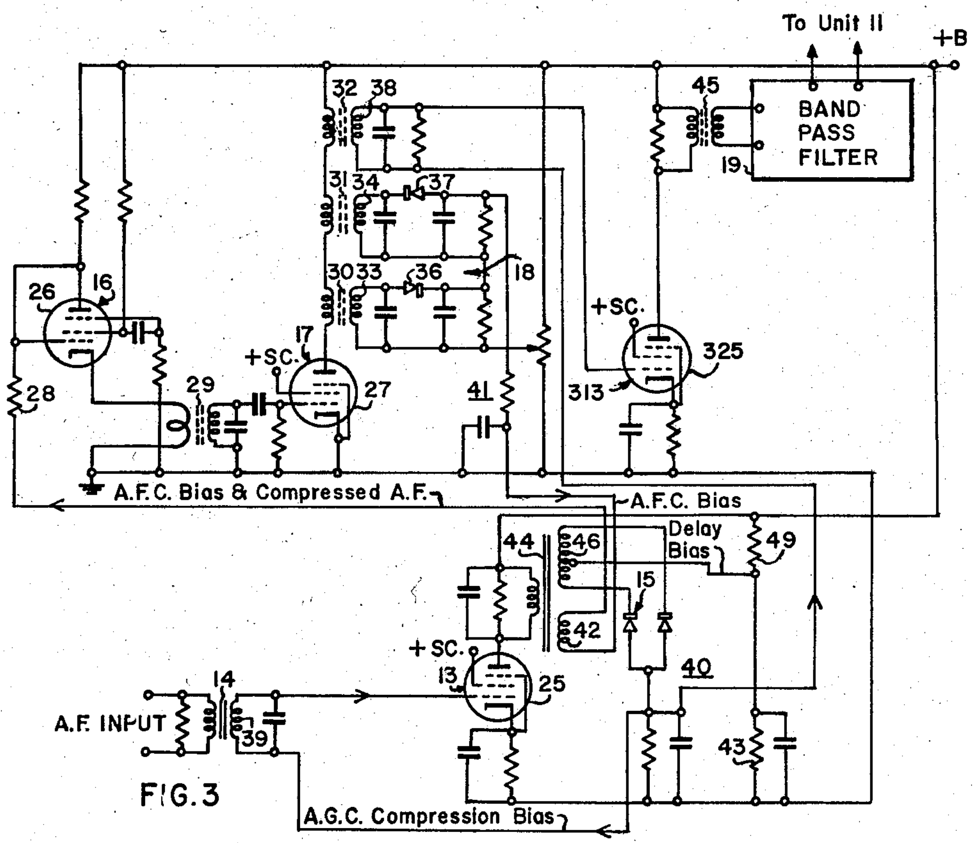
Figure 4:
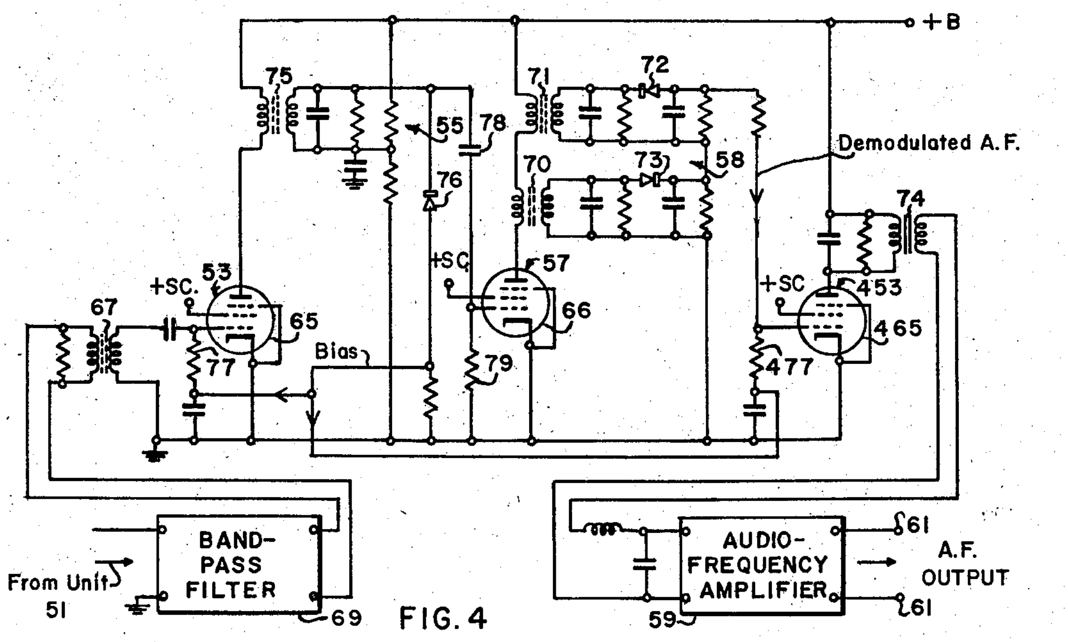

Referring to the drawings:

Fig. 1 is a schematic diagram of a transmitting terminal station of a multichannel communication system in accordance with the present invention;

Fig. 1*a* is a circuit diagram of a portion of the Fig. 1 station;

Fig. 2 is a schematic diagram of a receiving terminal station of a communication system in accordance with the invention;

Fig. 2*a* is a circuit diagram of a portion of the Fig. 2 station;

Fig. 3 is a circuit diagram illustrating an alternative arrangement of the circuit of Fig. 1*a*, and Fig. 4 is a circuit diagram illustrating an alternative arrangement of the circuit of Fig. 2*a*.

*Description of transmitter of Figs. 1 and 1a*

In Fig. 1 of the drawings, in order to simplify the representation, there is represented in block form only one transmitter of a terminal station 10 of a communication system in accordance with the invention. It will be understood that the terminal station 10 includes a plurality of such transmitters, a transmitter being coupled to each of the conductors represented by the arrows of units 11 and 12. For convenience of identification, station 10 will be referred to as the first terminal station while another terminal station effectively constituting a receiver at the other end of the communication system will be referred to as the second terminal station and will be described subsequently. The first terminal station 10 includes a plurality of volume compressors individually responsive to individual ones of a plurality of modulating signals for developing therefrom volume-compressed signals. Each volume compressor includes a variable-gain amplifier 13 having a transformer-coupled input circuit 14 to which the audio signal on that channel is supplied. The amplifier 13 has an output circuit coupled to an envelope detector or automatic-gain-control (AGC) rectifier 15 which, in turn, has its output circuit coupled to the secondary winding of the transformer in the input circuit 14 of the amplifier 13.

The first terminal station 10 also includes a plurality of devices individually responsive to individual ones of the volume-compressed signals from the amplifiers, such as unit 13, for producing wave signals frequency-modulated thereby. Each such device comprises a relaxation oscillator 16 adapted to be frequency-modulated by the signal from amplifier 13 and preferably includes, for the purpose of stabilizing the mid-frequency thereof, a feedback circuit comprising in cascade between the output circuit and the input circuit of unit 16 a limiter 17 and a frequency detector or discriminator 18 for supplying to unit 16 a unidirectional bias which serves as an automatic-frequency-control potential (AFC).

The terminal station 10 further includes a plurality of means individually responsive to individual ones of the frequency-modulated wave signals from the frequency-modulated oscillators thereof for developing therefrom amplitude-modulated wave signals having amplitudes varying inversely with the amplitudes of the aforesaid modulating signals. Each of these means may comprise a separate variable-gain amplifier having its input circuit coupled to the output circuit of its corresponding frequency-modulated oscillator through its limiter, such as the limiter 17. For economy of components, a unit such as the variable-gain amplifier 13 is preferably employed.

An output circuit of the amplifier 13 is coupled to unit 11 through a band-pass filter 19 proportioned to translate information in a band of frequencies representing a particular channel. Additional band-pass filters (not shown) are connected to unit 11 by circuits represented by the broken-line arrows. Each such filter translates information of a discrete channel and the mid-frequencies of such filters may have a suitable spacing, such as 10 kilocycles.

The signals applied by the filters to unit 11 are combined therein in frequency multiplex and the resultant signal is amplified in an amplifier 20 and, in turn, applied to a pair of conductors 21, 21 of a multipair electrical cable 22. Unit 12 is similarly coupled through an amplifier 23 to a pair of conductors 24, 24 of the cable 22. Eight channels for signaling in one direction are associated with each of units 11 and 12 and may occupy a pass band of from about 10 to 75 kilocycles. For signaling in the other direction, suitable equipment (not shown) but similar to that of Figs. 1*a* and 2*a* may be employed and may occupy a pass band of from 80 to 210 kilocycles. Noise is most serious in the higher carrier frequencies and, accordingly, the frequency deviation of those carriers is preferably arranged to be greater. For example, at the lower carrier frequencies of each group the deviation may be 4 kilocycles on either side of the mean carrier frequency while for the higher carrier frequencies the deviation may be twice that value. This, of course, necessitates that the higher carrier frequencies be spaced about 20 kilocycles apart while the lower carrier frequencies have a closer spacing, such as 10 kilocycles.

Referring now to the transmitter circuit of Fig. 1*a* of the drawings, it will be seen that the amplifier 13, the oscillator 16, and the limiter 17 include, respectively, pentodes 25, 26, and 27. The oscillator 16 is a conventional free-running relaxation oscillator of the phantastron type, the frequency of which is determined by the magnitude of the positive bias applied to the control electrode of tube 26 through a resistor 28 in the control electrode-cathode circuit thereof. The cathode of the tube 26 of the oscillator 16 is coupled to the control electrode of the tube 27 of the limiter 17 through a transformer 29 and the primary windings of three other transformers 30, 31, and 32 are connected in series in the anode circuit of the pentode 27 of the limiter 17. Tuned secondary windings 33 and 34 of the transformers 30 and 31, one tuned above and the other tuned below the mean carrier frequency of the oscillator 16, are connected in conventional manner to unidirectionally conductive devices such as crystal rectifiers 36 and 37 which comprise the frequency discriminator 18. The automatic-frequency-control bias developed by the discriminator 18 for correcting the center frequency of the oscillator 16, after being smoothed by a filter 41, is fed back to the control electrode of tube 26 of the oscillator 16 through a transformer secondary winding 42 and the resistor 28, the winding 42 being associated with the anode circuit of the amplifier 13.

The series combination of the tuned secondary winding 38 of the transformer 32 and the tuned secondary winding 39 of the transformer-coupled speech or audio-frequency circuit 14 is coupled between the control electrode of the pentode 25 and the usual time-constant network 40 of the automatic-gain-control rectifier 15 which supplies the volume-compression bias for reducing the gain of amplifier 13 when it is handling signals of large amplitude. A delay bias for the automatic-gain-control rectifier 15 is supplied thereto from a point on a voltage divider comprising a pair of resistors 49 and 43 connected across a source of potential +B. The primary windings of two transformers 44 and 45 are connected in the anode circuit of tube 25 of amplifier 13. Transformer 44 has a primary winding broadly tuned to the audio-frequency output signal of tube 25 and a secondary winding 46 thereof is connected to the automatic-gain-control rectifier 15 in a conventional manner. The transformer 45 is coupled to the band-pass filter 19 which has its parameters proportioned to suppress harmonics of the amplitude-modulated frequency-modulated wave signal supplied thereto for translation to the unit 11 as represented in Fig. 1*a* of the drawings.

*Description of receiver of Figs. 2 and 2a*

In Fig. 2 of the drawings, for the purpose of simplicity of illustration and ease of understanding, there is represented schematically only one receiver of a second terminal station 50 of a communication system in accordance with the present invention. It will be understood that the terminal station 50 includes a plurality of such receivers, a receiver being coupled to each of the conductors represented by the arrows of units 51 and 52. The second terminal station 50 includes a plurality of amplifiers, such as amplifiers 60 and 63, the former being coupled to the pair of conductors 21, 21 and the latter to the pair of conductors 24, 24 at the receiving end of the multipair electrical cable 22. The output circuits of the amplifiers 60 and 63 are coupled, respectively, to the units 51 and 52. A band-pass filter 69 corresponding in structure to the filter 19 of the first terminal station 10 of Fig. 1 is coupled to unit 51 for selecting the appropriate frequency-modulated carrier oscillations from the unit 51.

The second terminal station 50 includes a plurality of volume compressors individually responsive to individual ones of the amplitude-varying frequency-modulated wave signals translated by the cable 22 for developing therefrom volume-compressed wave signals of substantially constant amplitude. Each volume compressor includes a variable-gain amplifier 53 having an input circuit coupled to the filter 69 and an output circuit coupled to an envelope detector or automatic-gain-control (AGC) rectifier 55 which, in turn, has its output circuit coupled to the input circuit of the amplifier 53. The parameters of the rectifier 55 are selected to maintain the level of the output signal of the variable-gain amplifier 53 substantially constant, that is, independent of input level variations.

The terminal station 50 also includes a plurality of frequency detectors individually responsive to individual ones of the volume-compressed wave signals from the various variable-gain amplifiers such as amplifier 53 for deriving therefrom individual signals corresponding to said first-mentioned volume-compressed signals supplied to the transmitter terminal station 10. Each such detector includes a frequency detector or discriminator 58 having its input circuit coupled to the output circuit of the variable-gain amplifier through an amplitude limiter 57 and having its output circuit coupled to the input circuit of the amplifier 53 for supplying a signal derived by unit 58 to the amplifier 53 for amplification or modification thereby.

The terminal station 50 further includes a plurality of volume-expander means individually responsive to individual ones of the signals derived by the frequency discriminator 58 for producing signals which are faithfully representative of the modulating signals supplied to the transmitter terminal station 10 and are also relatively free from the effects of undesired cross talk. Each of these volume-expander means may comprise a separate variable-gain amplifier having its input circuit coupled to the output circuit of its corresponding frequency discriminator. For economy of components, however, each of the volume-expander means preferably comprises a unit such as the variable-gain amplifier 53.

An output circuit of the variable-gain amplifier 53 is coupled to an audio-frequency amplifier 59 which supplies an amplified output signal to a suitable sound-signal reproducing device, such as a telephone connected to output terminals 61, 61. It will be understood that equipment similar to that represented in Figs. 1 and 1*a* are employed in connection with the telephone associated with the terminals 61, 61 at terminal station 50 for establishing two-way communication with the telephone associated with the transformer input circuit 14 at the terminal station 10, the latter including receiver equipment similar to that represented in Figs. 2 and 2*a*.

Referring now to the details of the receiver circuit of Fig. 2*a* of the drawings, it will be observed that the amplifier 53 and the limiter 57 include, respectively, pentodes 65 and 66 which are arranged in a manner similar to the pentodes 25 and 27 of Fig. 1*a*. The band-pass filter 69 is coupled to the control electrode-cathode circuit of tube 65 through a transformer 67 and the output circuit of the frequency discriminator 58 is coupled through the secondary winding of transformer 67 to the control electrode of the tube 65. The primary windings of two transformers 70 and 71 are coupled in series relation in the anode circuit of the tube 66 of limiter 57 and the secondary windings thereof are coupled in a conventional manner to crystal diodes 72 and 73 in the circuit of the frequency discriminator 58. The primary windings of transformers 74 and 75 are connected in series relation between the anode of tube 65 and a source of potential +B. The secondary winding of transformer 74 is coupled to the input circuit of the audio-frequency amplifier 59 while the corresponding winding of transformer 75 supplies an audiofrequency signal to the crystal diode 76 of the AGC rectifier 55. The latter is connected through a resistor 77 to the control electrode of the tube 65 of amplifier 53 and is also connected through a coupling condenser 78 to the grid-leak resistor 79 and the control electrode of the tube 66 of limiter 57.

*Operation of transmitter of Figs. 1 and 1a*

Considering now the operation of the transmitter of the terminal station 10 of Figs. 1 and 1*a*, an audio-frequency signal, such as a telephone message, is applied to the transformer-coupled input circuit 14 of the variable-gain amplifier 13. The amplified output signal of the latter is applied to the automatic-gain-control rectifier 15 by way of a transformer 44 (see Fig. 1*a*) in the anode circuit of the tube 25. When the amplitude of the output signal of tube 25 applied to the transformer 44 exceeds a predetermined level and overcomes the delay bias afforded by the unidirectional potential developed across the resistor 43, a negative bias is developed across the time-constant network 40 of the rectifier 15 and is applied as an automatic-gain-control potential through the secondary winding 39 of transformer 14 and the secondary winding 38 of transformer 32 to the control electrode of the tube 25 in the variable-gain amplifier 13. This gain-control potential reduces the gain of the amplifier for large amplitude signals applied to the input terminals of the transformer 14 and compresses the volume range of the input signal. The volume-compressed audio-frequency output signal of amplifier 13 is applied by the secondary winding 42 in the anode circuit of tube 25 through the resistor 28 to the control electrode of the tube 26 of oscillator 16 and is effective to produce a frequency-modulated wave signal in the cathode output circuit of the oscillator.

The stability of the relatively simple and inexpensive phantastron relaxation oscillator 16 is not high. Accordingly, the frequency-modulated output signal of the oscillator is applied through the transformer 29 to the input circuit of the limiter 17 and the amplitude-limited output signal of the latter is applied by the transformers 30 and 31 to the discriminator 18 which develops a bias potential that a smoothed by the filter 41 and applied through winding 42 and the resistor 28 as an automatic-frequency-control potential to the control electrode of the tube 26 of the oscillator to control its mean frequency of operation.

The frequency-modulated output signal of the oscillator 16 may have amplitude variations and these are removed by the limiter 17. The transformer 32 in the anode circuit of the limiter applies the amplitude-limited frequency-modulated wave signal to the control electrode of the tube 25 of the variable-gain amplifier 13. The latter is effective to modify the amplitude level of the frequency-modulated wave signal inversely with amplitude of the audio-frequency signal applied to the input circuit 14. The transformer 45 in the anode circuit of the tube 25 applies the amplitude-varying frequency-modulated wave signal to the band-pass filter 19. The signal passed by the filter 19 is combined in unit 11 (see Fig. 1) with seven similar signals that are generated in the manner described above, all eight of the frequency-modulated wave signals having different mean frequencies. The resulting frequency-multiplexed signal from the eight channels is applied to the amplifier 20 of Fig. 1 and the latter applies an amplified resultant signal to the pairs of conductors 21, 21 of the multipair cable 22. Coupling exists between the various conductor pairs, such as the conductors 21, 21 and 24, 24, and ordinarily gives rise to large values of undesired cross talk in the various communication channels associated with those conductors. It is this cross talk which the communication system of the present invention materially reduces.

For direct-current signaling over the described channel when no speech is being transmitted, for example, for ringing or other signaling prior to setting up a telephone call, the frequency of the carrier-frequency wave signal generated by oscillator 16 may be shifted to represent such a direct-current signal. This may be effected by switching in an additional condenser (not shown) across a condenser in the tuned circuit of the frequency discriminator 18 so as to vary its natural frequency and thereby control the operating frequency of the oscillator 16.

*Operation of receiver of Figs. 2 and 2a*

Referring now to Fig. 2, the resultant signal appearing on the conductors 21, 21 at the receiver end of the multipair cable 22 is applied to the amplifier 60 wherein it is amplified and applied to the unit 51. The various band-pass filters, such as the filter 69, select the desired amplitude-varying frequency-modulated wave signal from the resultant signal and translate it to the input circuit of the variable-gain amplifier 53. The amplified output signal of amplifier 53 is applied by the transformer 75 (see Fig. 2*a*) in the anode circuit of tube 65 to the AGC rectifier 55 which develops a bias potential for application through the resistor 77 to the control electrode of tube 65 for controlling the gain thereof. The crystal rectifier 76 is poled so as to develop a control bias which becomes more positive as the amplitude of the signal applied to the control electrode of tube 65 decreases. Accordingly, any variations in the amplitude of the amplitude-varying frequency-modulated wave signal passed by the filter 69 are substantially smoothed out by the amplifier 53 so that an increase in the gain of the amplifier 13 in the transmitter terminal station 10 of the multichannel communication system causes a corresponding decrease in the gain of the amplifier 53. In other words, units 53 and 55 ensure that the over-all gain of the two amplifiers 13 and 53 remains substantially constant.

An output signal of the variable-gain amplifier 53 is translated by the transformer 75 in the anode circuit of tube 65 through the condenser 78 to the control electrode of the tube 66 of the amplitude limiter 57. The output signal of the latter is applied by the transformers 70 and 71 in the anode circuit of tube 66 to the frequency discriminator 58 which derives the amplitude-modulation components and applies them as a signal through the secondary winding of the transformer 67 to the input circuit of the tube 65 of the variable-gain amplifier 53. The signal derived from the diode 76 controls the gain of amplifier 53 in accordance with the amount of amplitude compression for the purpose of amplitude-expanding the signal supplied by the discriminator 58, thereby producing a signal which corresponds to the first-mentioned volume-compressed signal supplied by the amplifier 13 of Fig. 1 to the oscillator 16. Since the amplifiers 13 of Figs. 1 and 1*a* and 53 of Figs. 2 and 2*a* are controlled so that the over-all gain thereof remains substantially constant, it will be realized that the audio-frequency signal supplied to the transformer 74 in the output circuit of amplifier 53 corresponds with the input audio-frequency signal on that channel fed to the amplifier 13 with substantially no over-all compression or expansion. The transformer 74 applies the output signal of the variable-gain amplifier 53 to the audio-frequency amplifier 59 wherein it is amplified and applied to the output terminals 61, 61 for subsequent application to and utilization by a device such as a telephone.

*Description and operation of Figs. 3 and 4*

As mentioned previously, the units 13 of Fig. 1 and 53 of Fig. 2 may comprise separate variable-gain amplifiers. Figs. 3 and 4 show circuits utilizing such an arrangement. Fig. 3 illustrates a transmitter similar to that shown in Fig. 1*a* with corresponding components having the same reference numerals. The difference lies in the fact that a separate output variable-gain amplifier 313 comprising tube 325 is shown with its compression bias taken from the AGC rectifier 15. All other components in this figure correspond in description and operation to that of variable-gain amplifier 13 of Fig. 1*a*.

Similarly Fig. 4 shows a receiver with a separate output variable-gain amplifier 453, comprising tube 465 and grid bias resistor 477, coupled to the audio-frequency amplifier 59 with its bias taken from the AGC rectifier 55. In the same manner the description and operation of this circuit arrangement are similar to that of the receiver of Fig. 2*a*.

In the multichannel communication system described above, the amplitude of each wave signal is enhanced when the level of the input signal on the associated channel is relatively low so as to improve the signal-to-noise ratio of the channel under those conditions. It will be appreciated that much of the so-called "noise" will, in fact, be cross talk in channels in other groups arising from the coupling between the conductor pairs of the multipair cable 22.

The use of frequency-modulation in the translation of the information between the terminal stations 10 of Fig. 1 and 50 of Fig. 2 will afford an improvement in signal-to-cross-talk ratio. It is well known that frequency-modulated signals are less affected by interference than are amplitude-modulated signals. The immunity to interference from other signals of the same frequency is due to the "capture effect," that is, the stronger received signals tend to "capture" the receiver. The multichannel communication system of the present invention is capable of affording a further improvement which is obtained by enhancing the strengths of the carrier-frequency wave signals when they are unmodulated or are modulated by signals of low amplitude thus making them less sensitive to interference when this will be most noticeable.

If frequency shift of the frequency-modulated wave signal of a channel is utilized for direct-current signaling over that channel, this may be detected at the receiver described above by providing in the anode circuit of the tube 66 an additional frequency discriminator (not shown) tuned to the carrier frequency corresponding to the signaling condition, a portion of the output of the limiter 57 being fed to this discriminator and an electromagnetic relay or other device being supplied from this discriminator.

From the foregoing description, it will be clear that a multichannel communication system in accordance with the present invention affords an improved signal-to-cross-talk ratio and is relatively simple in construction and inexpensive to manufacture.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A multichannel communication system comprising: a first terminal station including a plurality of volume compressors individually responsive to individual ones of a plurality of modulating signals for developing therefrom volume-compressed signals, a plurality of devices individually responsive to individual ones of said volume-compressed signals for producing wave signals frequency-modulated thereby, and a plurality of means individually responsive to individual ones of said wave signals for developing therefrom amplitude-modulated wave signals having amplitudes varying inversely with the amplitudes of said modulating signals; a plurality of signal-translating paths which are coupled to said station for translating said developed wave signals but are subject to electrical couplings producing undesired cross talk in said system; and a second terminal station including a plurality of volume compressors individually responsive to individual ones of said translated wave signals for developing therefrom volume-compressed wave signals of substantially constant amplitude, a plurality of frequency detectors individually responsive to individual ones of said volume-compressed wave signals for deriving therefrom individual signals corresponding to said first-mentioned volume-compressed signals, and a plurality of volume-expander means individually responsive to individual ones of said derived signals for producing signals which are faithfully representative of said modulating signals and are relatively free from effects of undesired cross talk.

2. A multichannel communication system comprising: a first terminal station including a plurality of volume compressors individually responsive to individual ones of a plurality of modulating signals for developing therefrom volume-compressed signals, a plurality of oscillators individually responsive to individual ones of said volume-compressed signals for producing wave signals frequency-modulated thereby, and a plurality of means individually responsive to individual ones of said wave signals for developing therefrom amplitude-modulated wave signals having amplitudes varying inversely with the amplitudes of said modulating signals; a plurality of signal-translating paths which are coupled to said station for translating said developed wave signals but are subject to electrical couplings producing undesired cross talk in said system; and a second terminal station including a plurality of volume compressors individually responsive to individual ones of said translated wave signals for developing therefrom volume-compressed wave signals of substantially constant amplitude, a plurality of frequency detectors individually responsive to individual ones of said volume-compressed wave signals for deriving therefrom individual signals corresponding to said first-mentioned volume-compressed signals, and a plurality of volume-expander means individually responsive to individual ones of said derived signals for producing signals which are faithfully representative of said modulating signals and are relatively free from effects of undesired cross talk.

3. A multichannel communication system comprising: a first terminal station including a plurality of volume compressors individually responsive to individual ones of a plurality of modulating signals for developing therefrom volume-compressed signals, a plurality of voltage-controlled relaxation oscillators individually responsive to individual ones of said volume-compressed signals for producing wave signals frequency-modulated thereby, and a plurality of means individually responsive to individual ones of said wave signals for developing therefrom amplitude modulated wave signals having amplitudes varying inversely with the amplitudes of said modulating signals; a plurality of signal-translating paths which are coupled to said station for translating said developed wave signals but are subject to electrical couplings producing undesired cross talk in said system; and a second terminal station including a plurality of volume compressors individually responsive to individual ones of said translated wave signals for developing therefrom volume-compressed wave signals of substantially constant amplitude, a plurality of frequency detectors individually responsive to individual ones of said volume-compressed wave signals for deriving therefrom individual signals corresponding to the first-mentioned volume-compressed signals, and a plurality of volume-expander means individually responsive to individual ones of said derived signals for producing signals which are faithfully representative of said modulating signals and are relatively free from effects of undesired cross talk.

4. A multichannel communication system comprising: a first terminal station including a plurality of volume compressors individually responsive to individual ones of a plurality of modulating signals for developing therefrom volume-compressed signals, a plurality of frequency-stabilized relaxation oscillator devices individually responsive to individual ones of said volume-compressed signals for producing wave signals frequency-modulated thereby, and a plurality of means individually responsive to individual ones of said wave signals for developing therefrom amplitude-modulated wave signals having amplitudes varying inversely with the amplitudes of said modulating signals; a plurality of signal-translating paths which are coupled to said station for translating said developed wave signals but are subject to electrical couplings producing undesired cross talk in said system; and a second terminal station including a plurality of volume compressors individually responsive to individual ones of said translated wave signals for developing therefrom volume-compressed wave signals of substantially constant amplitude, a plurality of frequency detectors individually responsive to individual ones of said volume-compressed wave signals for deriving therefrom individual signals corresponding to said first-mentioned volume-compressed signals, and a plurality of volume-expander means individually responsive to individual ones of said derived signals for producing signals which are faithfully representative of said modulating signals and are relatively free from effects of undesired cross talk.

5. A multichannel communication system comprising: a first terminal station including a plurality of volume compressors individually responsive to individual ones of a plurality of modulating signals for developing therefrom volume-compressed signals, a plurality of relaxation oscillator devices having feed-back circuits comprising in cascade amplitude limiters and frequency discriminators for stabilizing the center frequency of said oscillators individually responsive to individual ones of said volume-compressed signals for producing wave signals frequency-modulated thereby, and a plurality of means individually responsive to individual ones of said wave signals for developing therefrom amplitude-modulated wave signals having amplitudes varying inversely with the amplitudes of said modulating signals; a plurality of signal-translating paths which are coupled to said station for translating said developed wave signals but are subject to electrical couplings producing undesired cross talk in said system; and a second terminal station including a plurality of volume compressors individually responsive to the individual ones of said translated wave signals for developing therefrom volume-compressed wave signals of substantially constant amplitude, a plurality of frequency detectors individually responsive to individual ones of said volume-compressed wave signals for deriving therefrom individual signals corresponding to said first-mentioned volume-compressed signals, and a plurality of volume-expander means individually responsive to individual ones of said derived signals for producing signals which are faithfully representative of said modulating signals and are relatively free from effects of undesired cross talk.

6. A multichannel communication system comprising: a first terminal station including a plurality of volume compressors individually responsive to individual ones of a plurality of modulating signals for developing therefrom volume-compressed signals, a plurality of devices individually responsive to individual ones of said volume-compressed signals for producing wave signals frequency-modulated thereby, and a plurality of means individually responsive to individual ones of said wave signals for developing therefrom amplitude-modulated wave signals having amplitudes varying inversely with the amplitudes of said modulating signals; a plurality of conductor pairs of a multipair cable which are coupled to said station for translating said developed wave signals but are subject to electrical couplings producing undesired cross talk in said system; and a second terminal station including a plurality of volume compressors individually responsive to individual ones of said translated wave signals for developing therefrom volume-compressed wave signals of substantially constant amplitude, a plurality of frequency detectors individually responsive to individual ones of said volume-compressed wave signals for deriving therefrom individual signals corresponding to said first-mentioned volume-compressed signals, and a plurality of volume-expander means individually responsive to individual ones of said derived signals for producing signals which are faithfully representative of said modulating signals and are relatively free from effects of undesired cross talk.

7. A multichannel communication system comprising: a first terminal station including a plurality of volume compressors individually responsive to individual ones of a plurality of modulating signals for developing therefrom volume-compressed signals, a plurality of devices individually responsive to individual ones of said volume-compressed signals for producing wave signals frequency-modulated thereby, a plurality of limiters individually responsive to individual ones of said wave signals for developing relatively amplitude-free wave signals therefrom, and a plurality of means individually responsive to individual ones of said last-mentioned wave signals for developing therefrom amplitude-modulated wave signals having amplitudes varying inversely with the amplitudes of said modulating signals; a plurality of signal-translating paths which are coupled to said station for translating said developed wave signals but are subject to electrical couplings producing undesired cross talk in said system; and a second terminal station including a plurality of volume compressors individually responsive to individual ones of said translated wave signals for developing therefrom volume-compressed wave signals of substantially constant amplitude, a plurality of limiters individually responsive to individual ones of said volume-compressed wave signals for developing relatively amplitude-free wave signals therefrom, a plurality of frequency detectors individually responsive to individual ones of said last-mentioned amplitude-free volume-compressed wave signals for deriving therefrom individual signals corresponding to said first-mentioned volume-compressed signals, and a plurality of volume-expander means individually responsive to individual ones of said derived signals for producing signals which are faithfully representative of said modulating signals and are relatively free from effects of undesired cross talk.

8. A multichannel communication system comprising: a first terminal station including a plurality of volume compressors individually responsive to individual ones of a plurality of modulating signals for developing therefrom volume-compressed signals, a plurality of devices individually responsive to individual ones of said volume-compressed signals for producing wave signals frequency-modulated thereby, and a plurality of limiters individually responsive to individual ones of said wave signals for developing relatively amplitude-free wave signals therefrom, said volume compressors being individually responsive to individual ones of said last-mentioned wave signals for developing therefrom amplitude-modulated wave signals having amplitudes varying inversely with the amplitudes of said modulating signals; a plurality of signal-translating paths which are coupled to said station for translating said developed wave signals but are subject to electrical couplings producing undesired cross talk in said system; and a second terminal station including a plurality of volume compressors individually responsive to individual ones of said translated wave signals for developing therefrom volume-compressed wave signals of substantially constant amplitude, and a plurality of frequency detectors individually responsive to individual ones of said volume-compressed wave signals for deriving therefrom individual signals corresponding to said first-mentioned volume-compressed signals, said last-mentioned volume compressors being individually responsive to individual ones of said derived signals for producing signals which are faithfully representative of said modulating signals and are relatively free from effects of undesired cross talk.

9. A multichannel communication system comprising: a first terminal station including a plurality of volume compressors individually responsive to individual ones of a plurality of modulating signals for developing therefrom volume-compressed signals, a plurality of devices individually responsive to individual ones of said volume-compressed signals for producing wave signals frequency-modulated thereby, a plurality of means individually responsive to individual ones of said wave signals for developing therefrom amplitude-modulated wave signals having amplitudes varying inversely with the amplitudes of said modulating signals, and individual band-pass filters coupled to individual ones of said developing means and having different mid-frequencies spaced in accordance wtih a predetermined plan; a plurality of signal-translating paths which are coupled to said filters for translating said developed wave signals but are subject to electrical couplings producing undesired cross talk in said system; and a second terminal station including a plurality of volume compressors individually responsive to individual ones of said translated wave signals for developing therefrom volume-compressed wave signals of substantially constant amplitude, a plurality of frequency detectors individually responsive to individual ones of said volume-compressed wave signals for deriving therefrom individual signals corresponding to said first-mentioned volume-compressed signals, and a plurality of volume-expander means individually responsive to individual ones of said derived signals for producing signals which are faithfully representative of said modulating signals and are relatively free from effects of undesired cross talk.

10. A multichannel communication system comprising: a first terminal station including a plurality of volume compressors, comprising amplifiers and envelope detectors for controlling the gain of said amplifiers, individually responsive to individual ones of a plurality of modulating signals for developing therefrom volume-compressed signals, a plurality of devices individually responsive to individual ones of said volume-compressed signals for producing wave signals frequency-modulated thereby, and a plurality of means individually responsive to individual ones of said wave signals for developing therefrom amplitude-modulated wave signals having amplitudes varying inversely with the amplitudes of said modulating signals; a plurality of signal-translating paths which are coupled to said station for translating said developed wave signals but are subject to electrical couplings producing undesired cross talk in said system; and a second terminal station including a plurality of volume compressors, comprising amplifiers and envelope detectors for controlling the gain of said last-mentioned amplifiers, individually responsive to individual ones of said translated wave signals for developing therefrom volume-compressed wave signals of substantially constant amplitude, a plurality of frequency detectors individually responsive to individual ones of said volume-compressed wave signals for deriving therefrom individual signals corresponding to said first-mentioned volume-compressed signals, and a plurality of volume-expander means individually responsive to individual ones of said derived signals for producing signals which are faithfully representative of said modulating signals and are relatively free from effects of undesired cross talk.

11. A multichannel communication system comprising: a first terminal station including a plurality of volume compressors, comprising amplifiers and envelope detectors for controlling the gain of said amplifiers, individually responsive to individual ones of a plurality of modulating signals for developing therefrom volume-compressed signals, and a plurality of devices individually responsive to individual ones of said volume-compressed signals for producing wave signals frequency-modulated thereby, said amplifiers being individually responsive to individual ones of said wave signals for developing therefrom amplitude-modulated wave signals having amplitudes varying inversely with the amplitudes of said modulating signals; a plurality of signal-translating paths which are coupled to said station for translating said developed wave signals but are subject to electrical couplings producing undesired cross talk in said system; and a second terminal station including a plurality of volume compressors, comprising amplifiers and envelope detectors for controlling the gain of said last-mentioned amplifiers, individually responsive to individual ones of said translated wave signals for developing therefrom volume-compressed wave signals of substantially constant amplitude, and a plurality of frequency detectors individually responsive to individual ones of said volume-compressed wave signals for deriving therefrom individual signals corresponding to said first-mentioned volume-compressed signals, said last-mentioned amplifiers being individually responsive to individual ones of said derived signals for producing signals which are faithfully representative of said modulating signals and are relatively free from effects of undesired cross talk.

12. A multichannel communication system comprising: a first terminal station including a plurality of volume compressors, comprising pentode amplifiers and envelope detectors for controlling the gain of said amplifiers, individually responsive to individual ones of a plurality of modulating signals for developing therefrom volume-compressed signals, and a plurality of pentode oscillators individually responsive to individual ones of said volume-compressed signals for producing wave signals frequency-modulated thereby, said amplifiers being individually responsive to individual ones of said wave signals for developing therefrom amplitude-modulated wave signals having amplitudes varying inversely with the amplitudes of said modulating signals; a plurality of signal-translating paths which are coupled to said station for translating said developed wave signals but are subject to electrical couplings producing undesired cross talk in said system; and a second terminal station including a plurality of volume compressors, comprising pentode amplifiers and envelope detectors for controlling the gain of said last-mentioned amplifiers, individually responsive to individual ones of said translated wave signals for developing therefrom volume-compressed wave signals of substantially constant amplitude, and a plurality of frequency detectors individually responsive to individual ones of said volume-compressed wave signals for deriving therefrom individual signals corresponding to said first-mentioned volume-compressed signals, said last-mentioned amplifiers being individually responsive to individual ones of said derived signals for producing signals which are faithfully representative of said modulating signals and are relatively free from effects of undesired cross talk.

13. A multichannel communication system comprising: a first terminal station including a plurality of volume compressors, comprising pentode amplifiers and envelope detectors for controlling the gain of said amplifiers individually responsive to individual ones of a plurality of modulating signals for developing therefrom volume-compressed signals, a plurality of pentode oscillators individually responsive to individual ones of said volume-compressed signals for producing wave signals frequency-modulated thereby, and a plurality of pentode limiters individually responsive to individual ones of said wave signals for developing relatively amplitude-free wave signals therefrom, said amplifiers being individually responsive to individual ones of said last-mentioned wave signals for developing therefrom amplitude-modulated wave signals having amplitudes varying inversely with the amplitudes of said modulating signals; a plurality of signal-translating paths which are coupled to said station for translating said developed wave signals but are subject to electrical couplings producing undesired cross talk in said system; and a second terminal station including a plurality of volume compressors, comprising pentode amplifiers and envelope detectors for controlling the gain of said last-mentioned amplifiers, individually responsive to individual ones of said translated wave signals for developing therefrom volume-compressed wave signals of substantially constant amplitude, a plurality of limiters individually responsive to individual ones of said volume-compressed wave signals for developing relatively amplitude-free wave signals therefrom, and a plurality of frequency detectors individually responsive to individual ones of said last-mentioned amplitude-free volume-compressed wave signals for deriving therefrom individual signals corresponding to said first-mentioned volume-compressed signals, said last-mentioned amplifiers being individually responsive to individual ones of said last-mentioned derived signals for producing signals which are faithfully representative of said modulating signals and are relatively free from effects of undesired cross talk.

14. A multichannel communication system comprising: a first terminal station including a plurality of volume compressors individually responsive to individual ones of a plurality of modulating signals for developing therefrom volume-compressed signals, and responsive to individual ones of a plurality of frequency-modulated wave signals for developing therefrom amplitude-modulated wave signals having amplitudes varying inversely with the amplitudes of said modulating signals, and including a plurality of devices individually responsive to individual ones of said volume-compressed signals for producing said frequency-modulated wave signals; a plurality of signal-translating paths which are coupled to said station for translating said developed wave signals, but are subject to electrical couplings producing undesired cross talk in said system; and a second terminal station including a plurality of volume compressors individually responsive to individual ones of said translated wave signals for developing therefrom volume-compressed wave signals of substantially constant amplitude and responsive to individual ones of signals corresponding to said first-mentioned volume-compressed signals for producing signals which are faithfully representative of said modulating signals and are relatively free from effects of undesired cross talk, and including a plurality of frequency detectors individually responsive to individual ones of said second-mentioned volume-compressed wave signals for deriving therefrom said signals corresponding to said first-mentioned volume-compressed signals.

References Cited in the file of this patent

UNITED STATES PATENTS

| | | |
|---|---|---|
| 2,421,727 | Thompson | June 3, 1947 |
| 2,636,081 | Feldman | Apr. 21, 1953 |